US009618990B2

(12) United States Patent
Lu et al.

(10) Patent No.: US 9,618,990 B2
(45) Date of Patent: Apr. 11, 2017

(54) ELECTRONIC DEVICE AND POWER MANAGEMENT METHOD THEREOF (71) Applicants: Shih-Chin Lu, Taipei (TW); Chung-Chi Tsou, Taipei (TW); Chun-Te Lin, Taipei (TW)

(72) Inventors: Shih-Chin Lu, Taipei (TW); Chung-Chi Tsou, Taipei (TW); Chun-Te Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 331 days.

(21) Appl. No.: 13/676,042

(22) Filed: Nov. 13, 2012

(65) Prior Publication Data

US 2013/0124892 A1  May 16, 2013

Related U.S. Application Data (60) Provisional application No. 61/559,200, filed on Nov. 14, 2011.

(51) Int. Cl.
G06F 1/00 (2006.01)
G06F 1/30 (2006.01)
G06F 1/32 (2006.01)

(52) U.S. Cl.
CPC ............. G06F 1/30 (2013.01); G06F 1/324 (2013.01); G06F 1/3212 (2013.01); Y02B 60/1217 (2013.01); Y02B 60/1292 (2013.01)

(58) Field of Classification Search
CPC ......... G06F 1/3234; G06F 1/3212; G06F 1/30
USPC ...................................................... 713/323
See application file for complete search history.

(56) References Cited

U.S. PATENT DOCUMENTS

| 7,512,824 | B2 * | 3/2009 | Artman | G06F 1/30 |
| | | | | 713/300 |
| 2004/0257730 | A1 * | 12/2004 | Suzuki et al. | 361/62 |
| 2006/0103996 | A1 * | 5/2006 | Carroll et al. | 361/90 |
| 2006/0164447 | A1 * | 7/2006 | Poole et al. | 347/5 |

(Continued)

FOREIGN PATENT DOCUMENTS

| TW | I247471 | 1/2006 |
| TW | 200638186 | 11/2006 |

(Continued)

OTHER PUBLICATIONS

"Office Action of Taiwan Counterpart Application", issued on Dec. 9, 2014, p. 1-p. 9, in which the listed references were cited.

Primary Examiner — Jaweed A Abbaszadeh
Assistant Examiner — Austin Hicks
(74) Attorney, Agent, or Firm — Jianq Chyun IP Office (57) ABSTRACT A power management method is suitable for an electronic device including a controller, a processor and a battery, and includes following steps. A first power is provided to the electronic device by a power adapter, and a maximum value of the first power is smaller than a maximum value of a rated consumed power of the electronic device. A power state of a second power of the battery is obtained by the controller. A control signal is generated according to the power state, and the processor adjusts an operation performance of the processor based on the control signal. The operation performance of the processor is continuously adjusted according to the power state.

27 Claims, 5 Drawing Sheets (56) References Cited

U.S. PATENT DOCUMENTS

| | | | | |
|---|---|---|---|---|
| 2006/0259794 | A1* | 11/2006 | Chen .................. | G06F 1/26 |
| | | | | 713/300 |
| 2007/0216363 | A1* | 9/2007 | Kawamoto et al. .......... | 320/132 |
| 2009/0262254 | A1* | 10/2009 | Reams .................. | 348/734 |
| 2012/0086276 | A1* | 4/2012 | Sawyers ............. | H02J 1/12 |
| | | | | 307/66 |
| 2013/0339757 | A1* | 12/2013 | Reddy ............. | G06F 1/3212 |
| | | | | 713/300 |

FOREIGN PATENT DOCUMENTS

| | | |
|---|---|---|
| TW | 200809480 | 2/2008 |
| TW | I336550 | 1/2011 |

* cited by examiner

ELECTRONIC DEVICE AND POWER MANAGEMENT METHOD THEREOF

CROSS-REFERENCE TO RELATED APPLICATION

This application claims the priority benefits of U.S. provisional application Ser. No. 61/559,200, filed on Nov. 14, 2011. The entirety of the above-mentioned patent applications is hereby incorporated by reference herein and made a part of this specification.

BACKGROUND

Field of the Invention

The present invention is directed to an electronic device and a power management method thereof and more particularly, to an electronic device adapted to being electrically connected to a power adapter and a battery and a power management method thereof.

Description of Related Art

Typically, an electronic device may be externally connected to a power adapter to provide power by using an AC power from a wall socket. Additionally, for a user's convenience of portability and usage, the electronic device may also be provided with power through an assembled battery. In other words, most of the electronic devices currently adopt a hybrid power design that combines the AC power with the battery power for maintaining the power required by a system.

As for the hybrid power design, a sum of the charge power and the discharge power of a battery is not allowed to exceed the power provided by the power adapter so that the battery may be used for a long time. Further, when the electronic device is provided with power solely from an external AC power, a rated consumed power of the electronic device is also not allowed to exceed the power provided from the power adapter so as to avoid the electronic device from being shut down suddenly.

Therefore, how to effectively manage the power of the electronic device to prolong the run time and the cycle life of the battery as well as avoid the sudden shutdown of the system has become a major subject for the design of the electronic device.

SUMMARY

The present invention provides a power management method for deciding whether to reset a power consumption of an electronic device in a hybrid power mode and controlling an operating frequency of the electronic device according to at least one reference frequency. Thus, the power consumption efficiency of the electronic device may be increased so that the run time and the cycle life of the battery may be prolonged.

The present invention is directed to an electronic device capable of determining whether to reset a power consumption of the electronic device according to a system voltage provided by a power adapter in a hybrid power mode so as to avoid the electronic device being shut down suddenly.

The present invention is directed to a power management method adapted to an electronic device including a controller, a processor and a battery and includes steps as follows. A first power is provided from a power adapter to the electronic device, wherein a maximum value of the first power is smaller than a maximum value of a rated consumed power required by the electronic device. A power state of a second power of the battery is obtained by using the controller. A control signal is generated according to the power state by the controller, and an operation performance of the processor is adjusted based on the control signal by the processor. The operation performance of the processor is continuously adjusted according to the power state.

The present invention is directed to an electronic device adapted to being provided with power through a power adapter and a battery, which includes a charger, a controller and a processor. The charger receives a first power provided from the power adapter to the electronic device and detects a power state of a second power of the battery, wherein a maximum value of the first power is smaller than a maximum value of a rated consumed power required by the electronic device. The controller is connected to the charger and generates a control signal according to the power state. The processor is connected to the controller to receive the control signal and adjusts an operation performance based on the control signal.

To sum up, when the electronic device of the present invention is switched to the hybrid power mode, the controller decides whether to reset the power consumption of the electronic device according to the system voltage provided by the power adapter and controls the operating frequency of the electronic device according to at least one reference frequency. Thus, even though the power adapter connected to the electronic device is a travel adaptor, the electronic device will not shut down suddenly, and the electronic device may be maintained in the normal operation by the travel adaptor and the battery. As such, the power usage efficiency of the electronic device can be improved and the run time and the cycle life of the battery can be prolonged.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
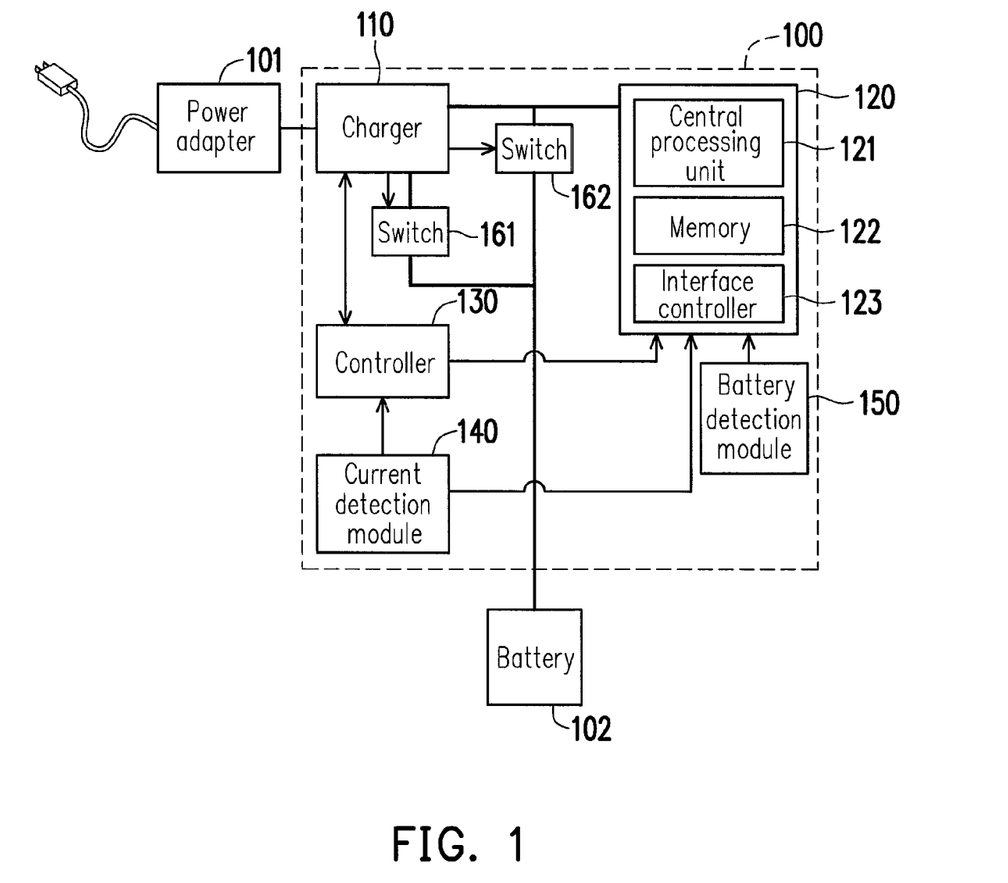
FIG. 1 is a schematic diagram illustrating an electronic device according to an exemplary embodiment of the present invention.

FIG. 1 is a schematic diagram illustrating an electronic device according to an exemplary embodiment of the present invention. Referring to FIG. 1, an electronic device 100 includes a charger 110, a processor 120, a controller 130, a current detection module 140, a battery detection module 150, a switch 161 and a switch 162. Additionally, the processor 120 includes a central processing unit (CPU) 121, a memory 122 and an interface controller 123. The CPU 121 is mainly responsible for various types of logical operations and program executions. The memory 122 is configured to store various types of data. The interface controller 123 is configured to coordinate input and output of the processor 120. Besides, the controller 130 may be, for example, an embedded controller, and the processor 120 may be, for example, a central processor or a display card processor.

Moreover, the electronic device 100 may be provided with power through the power adapter 101 and/or the battery 102. For instance, the power adapter 101 has a first power and is capable of providing the first power to the electronic device 100. A maximum value of the first power provided by the power adapter 101 is smaller than a maximum value of a rated consumed power of the electronic device 100. Additionally, the battery 102 has a second power and is capable of providing a second power to the electronic device 100. In other words, power supply states for the electronic device 100 include three modes, i.e. a hybrid power mode (the electronic device 100 is provided with power by both the power adapter 101 and the battery 102), an AC power mode (the electronic device 100 is provided with power solely by the power adapter 101) and a battery power mode (the electronic device 100 is provided with power solely by the battery 102). In addition, in different power supply states, the charger 110 controls the power provided to the processor 120 by adjusting conducting states of the switches 161 and 162. Further, the electronic device 100 analyzes and detects the power supply states of the electronic device 100 through the controller 130, the current detection module 140 and the battery detection module 150.

Figure 2:
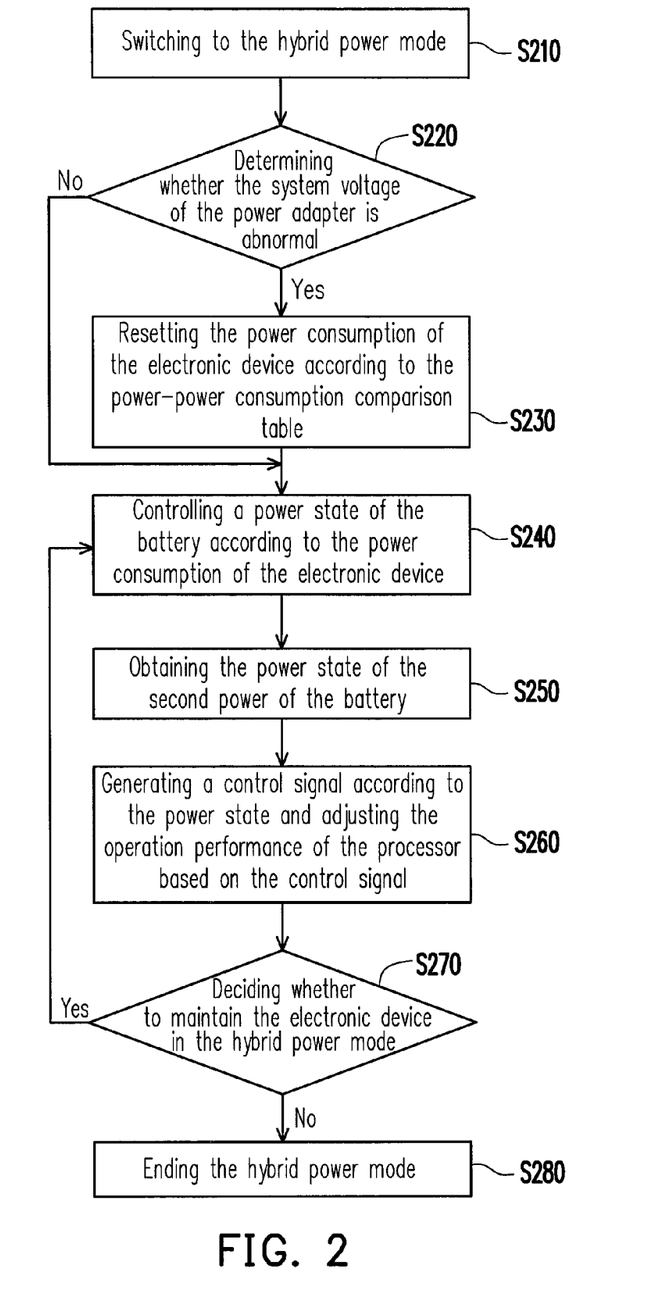
FIG. 2 is a flowchart illustrating a power management method in a hybrid power mode according to an exemplary embodiment of the present invention.

FIG. 2 is a flowchart illustrating a power management method in a hybrid power mode according to an exemplary embodiment of the present invention. Referring to FIG. 2 with FIG. 1 hereinafter, detailed operation of the electronic device 100 in the hybrid power mode will be illustrated. In step S210, when the electronic device 100 is provided with power by the power adapter 101 and the battery 102, the electronic device 100 is switched to the hybrid power mode and is provided with power by using the first power and the second power simultaneously. In the hybrid power mode, the power adapter 101 converts AC power to generate a system voltage and a system current for the electronic device 100 to use.

In addition, the charger 110 detects and records the system voltage and the system current provided by the power adapter 101 and reports the system voltage and the system current to the controller 130. Further, in step S220, the controller 130 further determines whether the system voltage provided by the power adapter 101 is abnormal. When a level of the system voltage does not stop shaking or drifting up and down, it represents that the system voltage is abnormal. At this time, the controller 130 determines that the first power of the power adapter 101 is smaller than a power consumption of the electronic device. Namely, for the electronic device 100, the power adapter 101 at this time is equivalent to a travel adapter.

In order to avoid a sudden shutdown of the electronic device 100 due to being externally connected to the travel adapter, as shown in step S230, when the controller 130 determines that the system voltage is abnormal, the controller 130 looks up a power-power consumption comparison table and resets the power consumption of the electronic device 100 according to a look-up result.

For example, at the beginning, in an initialization of the electronic device 100, the controller 130 regards the power adapter 101 as a standard adapter. Thus, the controller 130 sets the power consumption of the electronic device 100 according to a configuration (e.g. a CPU level, existence of an independent display card) of the electronic device 100. For instance, the power consumption is set as 65 W. However, when the system voltage is abnormal, the controller 130 determines that the power adapter 101 is a travel adapter and thus, resets the power consumption of the electronic device 100 according to the power-power consumption comparison table. For instance, the power consumption is reset as 30 W so as to decrease an operation performance of the processor 120. As such, the electronic device 100 will not be shut down suddenly due to being externally connected to the travel adapter.

Moreover, in step S240, the charger 110 controls a power state of the battery 102 according to the power consumption of the electronic device 100. For example, when the power consumption is smaller than the power provided by the charger, it represents that there is additional power available for charging the battery 102. Thus, at this time, the charger 110 switches the power state of the battery 102 to a charging mode by controlling the conducting states of the switches 161 and 162. Otherwise, when the power consumption is greater than the power provided by the charger, the charger 110 switches the power state of the battery 102 to a discharging mode.

Accordingly, if the original power consumption of the electronic device 100 is 65 W, the electronic device 100 still may be provided with power by the power adapter 101 which has the first power of 45 W and the battery 102. Namely, even though the electronic device 100 is externally connected to the travel adapter, the electronic device 100 is not shut down suddenly, and the electronic device 100 may be maintained in normal operation by the hybrid use of the travel adapter and the battery. On the other hand, if the system voltage is not abnormal, it represents that the power adapter 101 externally connected to the electronic device 100 is a standard adaptor, and thus, at this time, the controller 130 does not reset the power consumption of the electronic device 100.

Moreover, the charger 110 detects a power state of the second power provided by the battery 102. In addition, in step S250, the electronic device 100 obtains the power state of the second power which is provided by the battery 102 through the controller 130. Further, in step S260, the electronic device 100 adjusts the operation performance of the processor 120 according to the power state of the battery 102. For instance, the controller 130 generates a control signal according to the obtained power state, and the processor 120 adjusts the operation performance based on the control signal. Furthermore, in an exemplary embodiment, the operation performance of the processor 120 may be, for example, a clock frequency of the processor 120, and the clock frequency of the processor 120 may be, for example, an operating frequency of the CPU 121 in the electronic device 100. Moreover, in step S270, the controller 130 further determines whether the electronic device 100 is electrically connected to the power adapter 101 and the battery 102 simultaneously to decide whether to maintain the electronic device 100 in the hybrid power mode.

Here, if the electronic device 100 is continuously maintained in the hybrid power mode, then step S240 is returned to, and the power state of the battery 102 is continuously controlled, and by steps S250 and S260, the operation performance of the processor 120 is continuously adjusted. Namely, when the electronic device 100 is continuously maintained in the hybrid power mode, the electronic device 100 keeps adjusting the operation performance of the processor 120 according to the power state of the battery 102. Accordingly, the power of the electronic device 100 may be effectively managed so as to prolong the run time and cycle life of the battery 101. Oppositely, if one of the power adapter 101 and the battery 102 is electrically disconnected from the electronic device 100, the controller 130 perform step S280 so as to end the hybrid power mode.

It is to be mentioned that the power state of the battery 102 may be, for example, a discharge current, a remaining capacity or the like of the battery 102. In other words, in step S260, the electronic device 100 may adjust the operation performance of the processor 120 by using the discharge current or the remaining capacity of the battery 102. In order to enable persons of ordinary skill in the art to understand the exemplary embodiment of the present invention, step S260 will be described in more detail.

Figure 3:
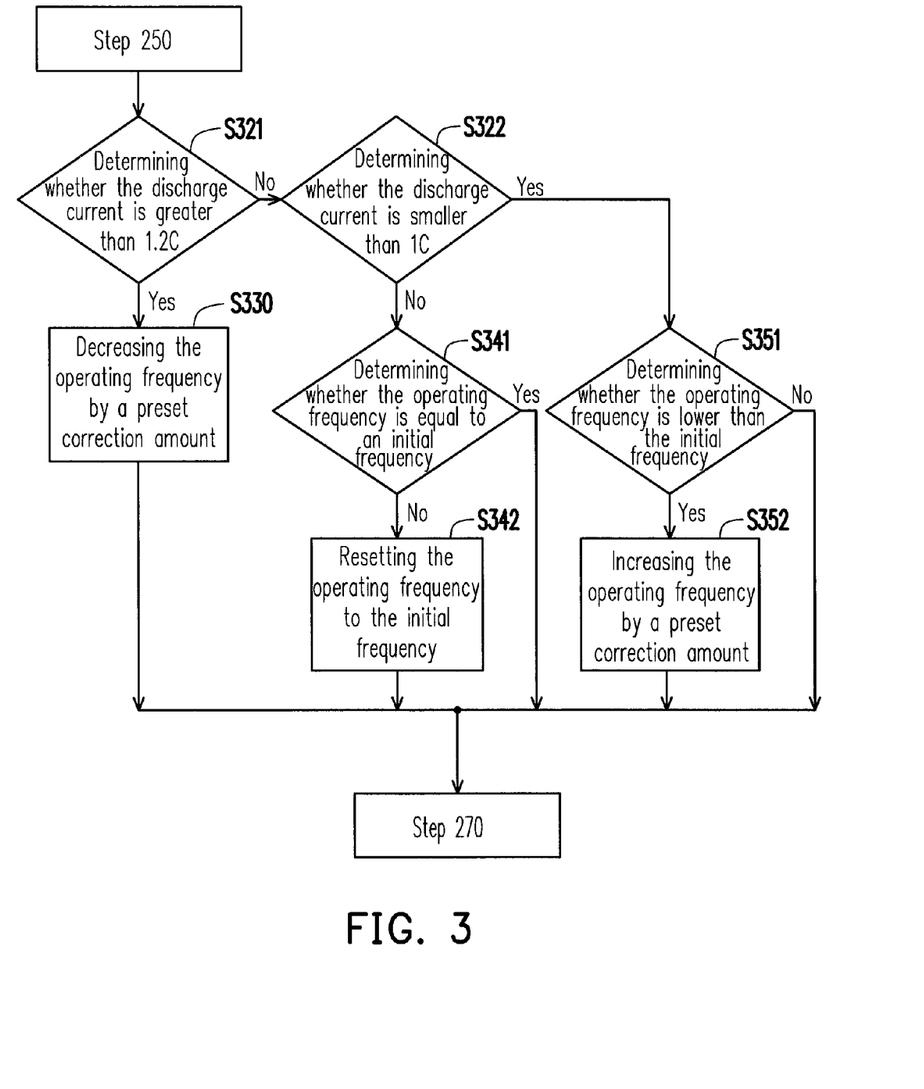
FIG. 3 is a detailed flowchart illustrating step S260 according to an exemplary embodiment of the present invention.

FIG. 3 is a detailed flowchart illustrating step S260 according to an exemplary embodiment of the present invention. Hereinafter, please refer to FIG. 3 with FIG. 1. In operation, the charger 110 detects the discharge current of the battery 102 and reports the detected discharge current to the controller 130. Additionally, the controller 130 determines a value of the discharge current by using a first threshold current (e.g. 1.2 C) and a second threshold current (e.g. 1 C). Namely, the controller 130 compares the discharge current of the battery 102 with the first threshold current and the second threshold current respectively.

For instance, in step S321, the controller 130 determines whether the discharge current is greater than the first threshold current (e.g. 1.2 C). If not, in step S322, the controller 130 further determines whether the discharge current is smaller than the second threshold current (e.g. 1 C). As a result, the controller 130 may determine that the discharge current is greater than the first threshold current (e.g. 1 C), between the first threshold current (e.g. 1.2 C) and the second threshold current (e.g. 1 C), or smaller than the second threshold current (e.g. 1 C).

When the discharge current is greater than the first threshold current (e.g. 1 C), in step S330, the controller 130 transmits a corresponding control signal to the processor 120, such that the processor 120 decreases the operating frequency of the CPU 121 by a preset correction amount based on the control signal. That is, the operating frequency of the CPU 121 at this time is decreased by a preset correction amount so that the operation performance of the processor 120 is decreased.

When the discharge current is between the first threshold current (e.g. 1.2 C) and the second threshold current (e.g. 1 C), in step S341, the controller 130 determines in advance whether the operating frequency of the CPU 121 is equal to an initial frequency. If yes, the operating frequency of the CPU 121 is not updated. Otherwise, if the operating frequency is not equal to the initial frequency, in step S342, the controller 130 transmits the corresponding control signal to the processor 120, such that the processor 120 resets the operating frequency of the CPU 121 to the initial frequency based on the control signal. Meanwhile, it is know that the initial state of the processor 120 is to maintain the operating frequency of the CPU 121 in the initial frequency. In other words, when the discharge current is between the first threshold current (e.g. 1.2 C) and the second threshold current (e.g. 1 C), the electronic device 100 adjusts the operation performance of the processor 120 to the initial state.

Moreover, when the discharge current is smaller than the second threshold current (e.g. 1 C), in step S351, the controller 130 determines in advance whether the operating frequency is lower than the initial frequency. If not, the operating frequency of the CPU 121 is not updated. Otherwise, if the operating frequency of the CPU 121 is lower than the initial frequency, that is, the operation performance of the processor 120 is lower than the initial state, in step S352, the controller 130 transmits the corresponding the control signal to the processor 120. Thus, the processor 120 increases the operating frequency of the CPU 121 by a preset correction amount based on the control signal. Namely, the operating frequency at this time is increased by a preset correction amount so that the operation performance of the processor 120 is increased.

In other words, when the discharge current of the battery 102 exceeds the first threshold current (e.g. 1.2 C), the operation performance of the processor 120 is decreased so as to decrease the discharge current of the battery 102. Additionally, when the discharge current of the battery 102 is between the first threshold current (e.g. 1.2 C) and the second threshold current (e.g. 1 C), the operation performance of the processor 120 is adjusted to the initial state. Further, when the discharge current is smaller than the second threshold current (e.g. 1 C), and the operation performance of the processor 120 is lower than the initial state, the operation performance of the processor 120 is increased, such that the discharge current of the battery 102 is increased. Accordingly, defects of over-current and over-temperature occurring in the battery 102 may be avoided.

Figure 4:
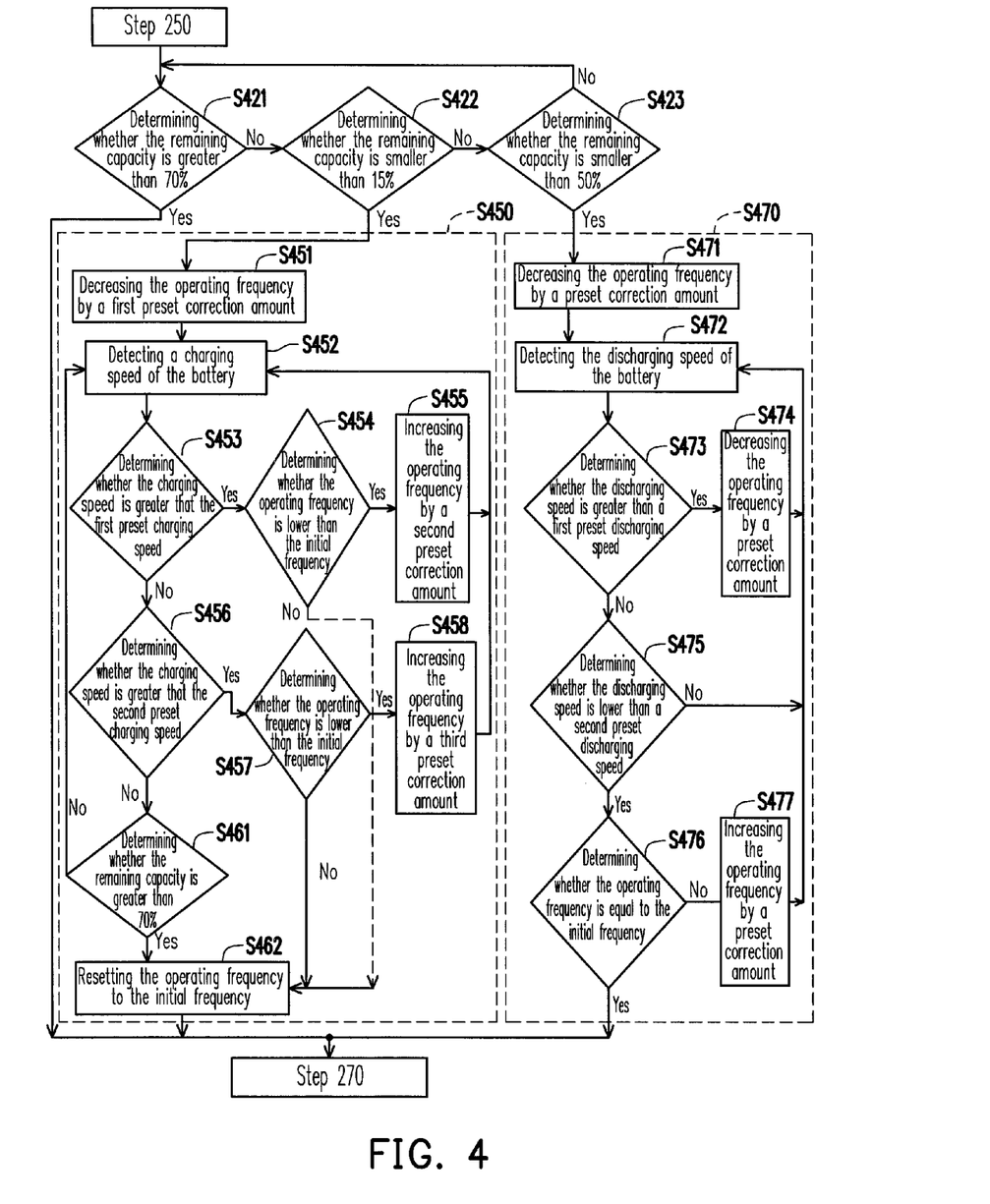
FIG. 4 is a detailed flowchart illustrating step S260 according to another exemplary embodiment of the present invention.

FIG. 4 is a detailed flowchart illustrating step S260 according to another exemplary embodiment of the present invention. Please refer to FIG. 4 with FIG. 1 hereinafter. In operation, the charger 110 detects a remaining capacity of the battery 102 and reports the detected remaining capacity to the controller 130. In addition, the controller 130 determines a value of the remaining capacity by using a first reference capacity (e.g. 70%), a second reference capacity (e.g. 50%) and a third reference capacity (e.g. 15%). Namely, the controller 130 compares the remaining capacity of the battery 102 with the first reference capacity, second reference capacity and the third reference capacity respectively.

For instance, in step S421, the controller 130 determines whether the remaining capacity is greater than the first reference capacity (e.g. 70%). If not, in step S422, the controller 130 further determines whether the remaining capacity is smaller than the third reference capacity (e.g. 15%). And, if not, the controller 130 further determines whether the remaining capacity is smaller than the second reference capacity (e.g. 50%). Thus, the controller 130 may determine that the remaining capacity is greater than the first reference capacity (e.g. 70%), smaller than the third reference capacity (e.g. 15%) or between the second reference capacity (e.g. 50%) and the third reference capacity (e.g. 15%).

When the remaining capacity is greater than the first reference capacity (e.g. 70%), the operation performance of the processor 120 is not adjusted and step S270 is directly performed. Further, when the remaining capacity is smaller than the third reference capacity (e.g. 15%), in step S450, the electronic device 100 adjusts the operation performance of the processor 120 according to a charging speed of the battery 102. Namely, the controller 130 generates a control signal according to the charging speed of the battery 102, such that the processor 120 adjusts the operation performance based on the control signal. Regarding the detailed process of step S450, as shown in step S451, the controller 130 transmits a corresponding control signal to the processor 120 to enable the processor 120 to decrease the operating frequency of the CPU 121 by a first preset correction amount. For instance, if the processor 120 adjusts the operating frequency of the CPU 121 by a unit of correction amount, the operating frequency of the CPU 121 is decreased by four times the unit of correction amount, such that the operation performance of the processor 120 is drastically decreased.

Afterward, in step S452, the charger 110 detects a charging speed of the battery 102 and reports the detected charging speed to the controller 130. In addition, the controller 130 determines a value of the charging speed of the battery 102 by using a first preset charging speed (e.g. increasing 12% of the battery capacity per 30 minutes) and a second preset charging speed (e.g. increasing 6% of the battery capacity per 30 minutes). Namely, the controller 130 compares the charging speed of the battery 102 with the first preset charging speed and the second preset charging speed respectively.

For instance, in step S453, the controller 130 determines in advance whether the charging speed of the battery 102 is greater that the first preset charging speed. As shown in step S454 and step S455, when the charging speed of the battery 102 is greater than the first preset charging speed, and the operating frequency of the CPU 121 is lower than the initial frequency (i.e. the operation performance of the processor 120 is lower than the initial state), the processor 120 increases the operating frequency of the CPU 121 by a second preset correction amount. For example, the operating frequency of the CPU 121 is increased by twice the unit of correction amount, so that the performance of the operation performance of the processor 120 is increased for two levels of energy efficiency. Meanwhile, after increasing the operating frequency, step S452 is returned to, and the operating frequency of the CPU 121 is continuously updated according to the charging speed of the battery 102. Otherwise, if the operating frequency is determined as not lower than the initial frequency in step S454, step S462 is returned to, and the operating frequency of the CPU 121 is reset to the initial frequency.

Moreover, as shown in step S457 and step S458, when the charging speed of the battery 102 is between the first preset charging speed and the second preset charging speed, and the operating frequency of the CPU 121 is lower than the initial frequency (i.e. the operation performance of the processor 120 is lower than the initial state), the processor 120 increases the operating frequency of the CPU 121 by a third preset correction amount. For example, the operating frequency of the CPU 121 is increased by one unit of correction amount, such that the operation performance of the processor 120 is increased for one level of energy efficiency. Further, after increasing the operating frequency, step S452 is returned to, and the operating frequency of the CPU 121 is continuously updated according to the charging speed of the battery 102. Otherwise, if the operating frequency is determined as not lower than the initial frequency in step S457, step S462 is returned to.

Moreover, when the charging speed of the battery 102 is lower than the second preset charging speed, in step S461, the controller 130 determines whether the remaining capacity of the battery 102 is greater than the first reference capacity (e.g. 70%). When the remaining capacity of the battery 102 is not greater than the first reference capacity (e.g. 70%), the controller 130 returns to step S452 to continue to detect the charging speed of the battery 102. Additionally, when the remaining capacity of the battery 102 is greater than the first reference capacity (e.g. 70%), step S462 is returned to, and the operating frequency of the CPU 121 is reset to the initial frequency.

In other words, when the remaining capacity of the battery 102 is smaller than the third reference capacity (e.g. 15%), the electronic device 100 first drastically decreases the operation performance of the processor 120 (for example, directly decreases the operating frequency of the CPU 121 for four times the preset correction amount) and then, successively increases the operation performance of the processor 120 according to the charging speed of the battery 102. Thus, when the remaining capacity of the battery 102 is too small, the defect of crash occurring in the electronic device 100 may be avoided.

Continuously referring to FIG. 4 with FIG. 1, when the remaining capacity is between the second reference capacity (e.g. 50%) and the third reference capacity (e.g. 15%), in step S470, the electronic device 100 adjusts the operation performance of the processor 120 according to a discharging speed of the battery 102. Regarding the detailed process of step S470, as shown in step S471, the controller 130 transmits a corresponding control signal to the processor 120 so as to enable the processor 120 to decrease the operating frequency of the CPU 121 by a preset correction amount. Namely, the operating frequency of the CPU 121 at this time is decreased for a preset correction amount, such that the operation performance of the processor 120 is decreased for one level of energy efficiency. Afterward, in step S472, the charger 110 detects the discharging speed of the battery 102 and reports the detected discharging speed to the controller 130. Meanwhile, the controller 130 determines a value of the discharging speed of the battery 102 by using a first preset discharging speed (e.g. decreasing 6% of the battery capacity per 30 minutes) and a second preset discharging speed (e.g. decreasing 4% of the battery capacity per 30 minutes). Namely, the controller 130 compares the discharging speed of the battery 102 with the first preset discharging speed and the second preset discharging speed respectively.

For instance, in step S473, the controller 130 determines in advance whether the discharging speed of the battery 102 is greater than the first preset discharging speed. When the discharging speed of the battery 102 is greater than the first preset discharging speed, in step S474, the controller 130 transmits a corresponding control signal to the processor 120 to enable the processor 120 to decrease again the operating frequency of the CPU 121 by a preset correction amount. Afterward, step S472 is returned to, and the operating frequency of the CPU 121 is continuously updated according to the discharging speed of the battery 102. When the discharging speed of the battery 102 is not greater than the first preset discharging speed, in step S475, the controller 130 determines whether the discharging speed of the battery 102 is lower than the second preset discharging speed. When the discharging speed of the battery 102 is not lower than the second preset discharging speed, step S472 is returned to. Further. as shown in step S476 and step S477, when the discharging speed of the battery 102 is lower than the second preset discharging speed, and the operating frequency of the CPU 121 is not equal to the initial frequency (i.e. the operation performance of the processor 120 is not in the initial state), the processor 120 increase the operating frequency of the CPU 121 by a preset correction amount, such that the operation performance of the processor 120 is increased for one level of energy efficiency.

In other words, when the remaining capacity of the battery 102 is between the second reference capacity (e.g. 50%) and the third reference capacity (e.g. 15%), the electronic device 100 successively decreases or increases the operation performance of the processor 120 according to the discharging speed of the battery 102. Thereby, when the battery 102 is overly used, the operation time of the battery 102 may be prolonged.

It is to be mentioned that when being switched to the battery power mode, the electronic device 100 also adjusts the operation performance of the processor 120 according to the power state of the battery. In the battery power mode, the electronic device 100 adjusts detailed operations of the operation performance of the processor 120 according to the power state of the battery, which is similar to the operation process of step S260 in FIG. 2. Therefore, the detailed operations regarding the electronic device 100 in the battery power mode will not be repeated.

Figure 5:
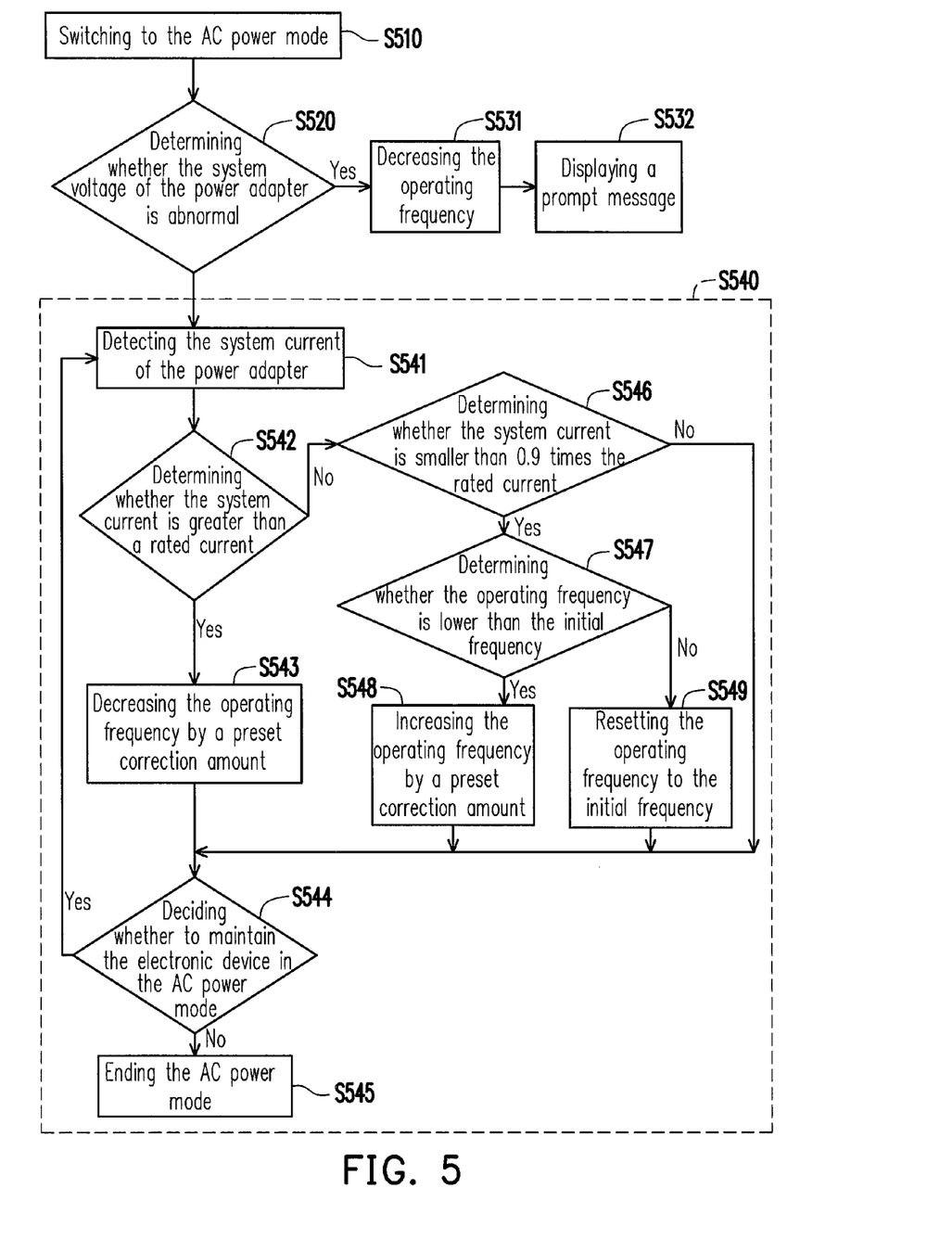
FIG. 5 is a flowchart illustrating a power management method in an AC power mode according to an exemplary embodiment of the present invention.

FIG. 5 is a flowchart illustrating a power management method in an AC power mode according to an exemplary embodiment of the present invention. Hereinafter, referring to FIG. 5 with FIG. 1, detailed operations of the electronic device 100 in the AC power mode is illustrated. In step S510, when the electronic device 100 is provided with power only from the power adapter 101, i.e. the electronic device 100 is provided with power only by using the first power of the power adapter 101, the electronic device 100 is switched to the AC power mode. In the AC power mode, the power adapter 101 converts the AC power to a corresponding system voltage and a corresponding system current for the electronic device 100 to use.

In addition, the charger 110 detects and records the system voltage and the system current provided by the power adapter 101 and reports the system voltage and the system current to the controller 130. Further, in step S520, the controller 130 further determines whether the system voltage provided by the power adapter 101 is abnormal. When the system voltage is abnormal, in step S531, the controller 130 transmits a corresponding control signal to the processor 120 so as to enable the processor 120 to decrease the operating frequency of the CPU 121. Namely, the operation performance of the processor 120 at this time is decreased. Meanwhile, in step S532, the controller 130 displays a prompt message. Therein, the content of the prompt message may be, for example, "The power provided form the power adapter is insufficient, please insert a battery". Thus, the sudden shutdown of the electronic device 100 may be avoided, and by prompting the user to insert the battery through the prompt message, the electronic device 100 may be switched into the hybrid power mode in response to the insertion of the battery.

When the system voltage is not abnormal, in step S540, the controller 130 adjusts the operation performance of the processor 120 according to the system current of the power adapter 101. Regarding the detailed process of step S540, as shown in step S541, the charger 110 detects and records the system current provided by the power adapter 101 and reports the system current to the controller 130. Further, in step S542, the controller 130 determines whether the system current is greater than a rated current.

When the system current is greater than the rated current, in step S543, the processor 120 is controlled by the controller 130 to decrease the operating frequency of the CPU 121 by a preset correction amount. Namely, under the control of the controller 130, the operation performance of the processor 120 at this time is decreased for one level of energy efficiency. Afterward, in step S544, the controller 130 determines whether the electronic device 100 is electrically connected to the power adapter 101 and electrically disconnected to the battery 102 so as to decide whether to maintain the electronic device 100 in the AC power mode. If the electronic device 100 is maintained in the AC power mode, step S541 is returned to, and operation performance of the processor 120 is continuously adjusted according to the system current of the power adapter 101. Otherwise, when the controller 130 and the power adapter 101 are electrically disconnected to each other, the controller 130 performs step S545 to end the AC power mode accordingly.

When the system current is not greater than the rated current, in step S546, the controller 130 further determines whether the system current is smaller than 0.9 times the rated current. When the system current is not smaller than 0.9 times the rated current, step S544 is returned to. When the system current is not smaller than 0.9 times the rated current, in step S547, the controller 130 further determines whether the operating frequency of the CPU 121 is lower than the initial frequency. Afterward, in step S548, when the operating frequency of the CPU 121 is lower than the initial frequency, the processor 120 increases the operating frequency of the CPU 121 by a preset correction amount. Namely, the operation performance of the processor 120 is increased for one level of energy efficiency. Otherwise, when the operating frequency of the CPU 121 is not lower than the initial frequency, in step S549, the processor 120 resets the operating frequency of the CPU 121 to the initial frequency. That is, the operation performance of the processor 120 at this time is decreased for one level of energy efficiency.

Continuously referring to FIG. 1, it is to be mentioned that the battery detection module 150 detects whether the electronic device 100 is electrically connected to the battery 102. When detecting that the electronic device 100 is electrically disconnected from the battery 102, the battery detection module 150 immediately transmits an interrupt signal to the processor 120. Further, in the hybrid power mode, the processor 120 switches the operating frequency of the CPU 121 to a lowest operating frequency within a buffer time since the interrupt signal is received. Namely, the operation performance of the processor 120 at this time is decreased down to a lowest performance. Thereby, in the hybrid power mode, even though the battery 102 is suddenly plugged out, the electronic device 100 will not be shut down suddenly.

Additionally, the current detection module 140 detects that a current variation (i.e. a variation of the system current) of the first power provided by the power adapter 101, and when the current variation is greater than a threshold value, the current detection module 140 immediately transmits an interrupt signal to the processor 120 and the controller 130. Besides, in the AC power mode, the processor 120 switches the operating frequency of the CPU 121 to a lowest operating frequency within a buffer time since the interrupt signal is received. Namely, the operation performance of the processor 120 at this time is decreased down to a lowest performance. Thereby, in the AC power mode, even though the power adapter 101 provides large current in an instant, the electronic device 100 is still maintained in operation.

In view of the foregoing, when the electronic device exemplarily illustrated in the present invention is switched to the hybrid power mode, the controller decides whether to reset the power consumption of the electronic device according to the system voltage provided by the power adapter. Thus, even though the power adapter connected to the electronic device is a travel adapter, the electronic device will not be shut down suddenly. Further, in the hybrid power mode, when the electronic device is externally connected to the travel adapter, the electronic device may also be maintained in normal operation by the hybrid of the travel adaptor and the battery. As such, the power usage efficiency of the electronic device can be improved and the rum time and the cycle life of the battery can be prolonged accordingly.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power management method, applicable to an electronic device comprising a controller, a processor and a battery, the power management method comprising:
   in a hybrid power mode, providing a first power to the electronic device by a power adapter and providing a second power to the electronic device by the battery, wherein a maximum value of the first power is smaller than a maximum value of a rated consumed power required by the electronic device;
   providing the electronic device with power through the first power and the second power simultaneously;
   when the electronic device is provided with power through the first power and the second power simultaneously, decreasing a clock frequency of the processor in response to determining that a system voltage of the power adapter is abnormal;
   in response to decreasing the clock frequency of the processor, obtaining a discharge current or a remaining capacity of the battery in the electronic device provided with power through the first power and the second power simultaneously;
   generating a control signal according to a power state of the second power by the controller and adjusting the clock frequency of the processor by the processor based on the control signal; and
   continuously adjusting the clock frequency of the processor according to the power state of the second power of the battery.

2. The power management method according to claim 1, wherein the controller is an embedded controller.

3. The power management method according to claim 1, wherein the processor is a central processor or a display card processor.

4. The power management method according to claim 1, further comprising:
   in the hybrid power mode, when the system voltage of the power adapter is abnormal, determining that the first power is smaller than a power consumption required by the electronic device and resetting the power consumption required by the electronic device according to a power-power consumption comparison table.

5. The power management method according to claim 4, wherein the step of resetting the power consumption required by the electronic device comprising:
   decreasing an operation performance of the processor.

6. The power management method according to claim 1, wherein the power state is the discharge current of the battery, and the step of adjusting the clock frequency of the processor based on the control signal comprise:
   comparing the discharge current with a first threshold current and a second threshold current respectively so as to adjust an operation performance of the processor, wherein the first threshold current is greater than the second threshold current;
   when the discharge current is greater than the first threshold current, decreasing the operation performance of the processor;
   when the discharge current is between the first threshold current and the second threshold current, adjusting the operation performance of the processor to an initial state; and
   when the discharge current is smaller than the second threshold current, and the operation performance of the processor is lower than the initial state, increasing the operation performance of the processor.

7. The power management method according to claim 1, wherein the power state is the remaining capacity of the battery and the step of adjusting the clock frequency of the processor based on the control signal comprise:
   comparing the remaining capacity with a first reference capacity, a second reference capacity and a third reference capacity respectively so as to adjust an operation performance of the processor, wherein the first reference capacity is greater than the second reference capacity, and the second reference capacity is greater than the third reference capacity;
   when the remaining capacity is greater than the first reference capacity, not adjusting the operation performance of the processor;
   when the remaining capacity is smaller than the third reference capacity, adjusting the operation performance of the processor according to a charging speed of the battery; and
   when the remaining capacity is between the second reference capacity and the third reference capacity, adjusting the operation performance of the processor according to a discharging speed of the battery.

8. The power management method according to claim 7, wherein the step of adjusting the operation performance of the processor according to the charging speed of the battery comprise:
   decreasing the operation performance of the processor by a first preset correction amount;
   detecting the charging speed of the battery;
   comparing the charging speed with a first preset charging speed and a second preset charging speed respectively so as to adjust the operation performance of the processor, wherein the first preset charging speed is greater than the second preset charging speed;
   when the charging speed is greater than the first preset charging speed, and the operation performance of the processor is lower than an initial state, increasing the operation performance of the processor by a second preset correction amount;
   when the charging speed is between the first preset charging speed and the second preset charging speed, and the operation performance of the processor is lower than the initial state, increasing the operation performance of the processor by a third preset correction amount; and
   when the charging speed is lower than the second preset charging speed, and the remaining capacity of the battery is not greater than the first reference capacity, returning to the step of detecting the charging speed of the battery.

9. The power management method according to claim 7, wherein the step of adjusting the operation performance of the processor according to the discharging speed of the battery comprise:
- decreasing the operation performance of the processor by a preset correction amount;
- detecting the discharging speed of the battery;
- comparing the discharging speed with a first preset discharging speed and a second preset discharging speed respectively so as to adjust the operation performance of the processor, wherein the first preset discharging speed is greater than the second preset discharging speed;
- when the discharging speed is greater than the first preset discharging speed, decreasing the operation performance of the processor by the preset correction amount and returning to the step of detecting the discharging speed of the battery;
- when the discharging speed is between the first preset discharging speed and the second preset discharging speed, returning to the step of detecting the discharging speed of the battery; and
- when the discharging speed is lower than the second preset discharging speed, and the operation performance of the processor is not in an initial state, increasing the operation performance of the processor by the preset correction amount and returning to the step of detecting the discharging speed of the battery.

10. The power management method according to claim 1, further comprising:
- in an AC power mode, providing power to the electronic device only by using the first power.

11. The power management method according to claim 10, further comprising:
- in the AC power mode, when the system voltage of the power adapter is abnormal, decreasing an operation performance of the processor and displaying a prompt message; and
- in the AC power mode, when the system voltage is not abnormal, adjusting the operation performance of the processor according to a system current of the power adapter.

12. The power management method according to claim 1, wherein the electronic device further comprises:
- a battery detection module, configured to detect whether the electronic device is electrically connected to the battery and transmit an interrupt signal to the processor to decrease an operation performance of the processor down to a lowest performance when detecting that the electronic device is electrically disconnected from the battery.

13. The power management method according to claim 1, wherein the electronic device further comprises:
- a current detection module, configured to detect a current variation of the first power provided by the power adapter and transmit an interrupt signal to the processor to decrease an operation performance of the processor down to a lowest performance when detecting that the current variation is greater than a threshold value.

14. An electronic device, adapted to be provided with power through a power adapter and a battery, the electronic device comprising:
- a charger, receiving a first power provided from the power adapter to the electronic device, wherein the first power has a maximum value that is smaller than a maximum value of a rated consumed power required by the electronic device, and the electronic device is provided with power through the first power and a second power of the battery simultaneously in a hybrid power mode;
- a processor; and
- a controller, connected to the charger and the processor, wherein when the electronic device is provided with power through the first power and the second power of the battery simultaneously, the controller decreases a clock frequency of the processor in response to determining that a system voltage of the power adapter is abnormal,
- in response to decreasing the clock frequency of the processor, the charger detects a discharge current or a remaining capacity of the battery in the electronic device provided with power through the first power and the second power simultaneously, the controller generates a control signal according to a power state of the second power, and the processor adjusts the clock frequency based on the control signal.

15. The electronic device according to claim 14, wherein the controller is an embedded controller.

16. The electronic device according to claim 14, wherein the processor is a central processor or a display card processor.

17. The electronic device according to claim 14, wherein in the hybrid power mode, when the system voltage of the power adapter is abnormal, the controller determines that the power provided by the power adapter is smaller than a power consumption required by the electronic device and resets the power consumption according to a power-power consumption comparison table, wherein a method to reset the power consumption of the electronic device is to decrease an operation performance of the processor.

18. The electronic device according to claim 14, wherein when the power state is the discharge current of the battery, the controller compares the discharge current with a first threshold current and a second threshold current respectively so as to adjust an operation performance of the processor, wherein the first threshold current is greater than the second threshold current.

19. The electronic device according to claim 18, wherein
- when the discharge current is greater than the first threshold current, the processor decrease the operation performance based on the control signal,
- when the discharge current is between the first threshold current and the second threshold current, the processor adjusts the operation performance to an initial state based on the control signal, and
- when the discharge current is smaller than the second threshold current, and the operation performance of the processor is lower than the initial state, the processor increases the operation performance based on the control signal.

20. The electronic device according to claim 14, wherein when the power state is the remaining capacity of the battery, the controller compares the remaining capacity with a first reference capacity, a second reference capacity and a third reference capacity respectively so as to adjust an operation performance of the processor wherein the first reference capacity is greater than the second reference capacity, and the second reference capacity is greater than the third reference capacity.

21. The electronic device according to claim 20, wherein
- when the remaining capacity is greater than the first reference capacity, the processor does not adjust the operation performance based on the control signal,
- when the remaining capacity is smaller than the third reference capacity, the controller generates the control signal according to a charging speed of the battery so as to adjust the operation performance based on the control signal, and when the remaining capacity is between the second reference capacity and the third reference capacity, the controller generates the control signal according to a discharging speed of the battery so as to adjust the operation performance.

22. The electronic device according to claim 21, wherein when the remaining capacity is smaller than the third reference capacity, the processor decreases the operation performance by a preset correction amount and successively increases the operation performance according to the charging speed of the battery.

23. The electronic device according to claim 21, wherein when the remaining capacity is between the second reference capacity and the third reference capacity, the processor decreases the operation performance by a preset correction amount and successively decreases or increases the operation performance according to the discharging speed of the battery.

24. The electronic device according to claim 14, wherein when the electronic device is provided with power only through the power adapter, and the system voltage of the power adapter is abnormal, the processor decreases an operation performance under the control of the controller, and the controller displays a prompt message.

25. The electronic device according to claim 14, wherein when the electronic device is provided with power only through the power adapter, and the system voltage of the power adapter is not abnormal, the controller generates the control signal according to a system current of the power adapter so as to control an operation performance of the processor.

26. The electronic device according to claim 14, wherein the electronic device further comprises a battery detection module which is configured to detect whether the electronic device is electrically connected to the battery and transmit a interrupt signal to the processor to decrease an operation performance of the processor down to a lowest performance when detecting that the electronic device is electrically disconnected from the battery.

27. The electronic device according to claim 14, wherein electronic device further comprises a current detection module which is configured to detect a current variation of the first power provided by the power adapter and transmit an interrupt signal to the processor to decrease an operation performance of the processor down to a lowest performance when detecting that the current variation is greater than a threshold value.

* * * * *